US012800358B2

(12) United States Patent
Dharani Dhar

(10) Patent No.: US 12,800,358 B2
(45) Date of Patent: Nov. 17, 2026

(54) NON-CONTACT MEASUREMENT OF A VEHICLE STEERING ANGLE

(71) Applicant: FCA US LLC, Auburn Hills, MI (US)

(72) Inventor: Mula Sai Dharani Dhar, Thoraipakkam (IN)

(73) Assignee: FCA US LLC, Auburn Hills, MI (US)

(*) Notice: Subject to any disclaimer, the term of this patent is extended or adjusted under 35 U.S.C. 154(b) by 160 days.

(21) Appl. No.: 18/781,221

(22) Filed: Jul. 23, 2024

(65) Prior Publication Data

US 2026/0029254 A1 Jan. 29, 2026

(51) Int. Cl.
*G01D 5/34* (2006.01)
*B62D 15/02* (2006.01)

(52) U.S. Cl.
CPC ........... *G01D 5/34* (2013.01); *B62D 15/0215* (2013.01)

(58) Field of Classification Search
CPC .............................. G01D 5/34; B62D 15/0215
See application file for complete search history.

(56) References Cited

U.S. PATENT DOCUMENTS 7,586,083 B2 9/2009 Vahabzadeh et al.
10,486,735 B2 11/2019 Fujita et al.
2014/0350771 A1* 11/2014 Sheu ...................... B62D 5/001 701/28
2024/0192341 A1* 6/2024 Richter .................. G01S 7/481

FOREIGN PATENT DOCUMENTS

DE 102008003026 B4 7/2015

* cited by examiner

*Primary Examiner* — Thanh Luu
*Assistant Examiner* — Mai Thi Ngoc Tran
(74) *Attorney, Agent, or Firm* — Jeremy J. Klobucar

(57) ABSTRACT

A system for measuring steering angle and a change of steering angle in a vehicle includes a steering shaft that is rotatable to change a steering angle of a vehicle, a reflector arranged radially spaced from a surface of the steering shaft, wherein the steering shaft is rotatable relative to the reflector, an emitter that emits light, and a receiver that receives light emitted from the emitter. Either the emitter or the receiver is carried by the steering shaft for rotation with the steering shaft, and the other of the emitter or receiver does not rotate with the steering shaft such that rotation of the steering shaft causes relative movement between the emitter and the reflector. The time between an emission of light from the emitter and receipt of light by the receiver is indicative of the steering angle.

20 Claims, 2 Drawing Sheets

NON-CONTACT MEASUREMENT OF A VEHICLE STEERING ANGLE

FIELD

The present disclosure relates to a system for measuring steering angle in a vehicle.

BACKGROUND

Vehicles include steering systems by which the direction of the vehicle can be controlled and changed as desired. The steering angle is changed by a direct mechanical connection between a steering input and a steering linkage, or by a steer by wire system in which an actuator drives the steering linkage. Steering angles are measured by hall effect sensors that utilize magnets and have limited response time and accuracy.

SUMMARY

In at least some implementations, a system for measuring steering angle and a change of steering angle in a vehicle includes a steering shaft that is rotatable to change a steering angle of a vehicle, a reflector arranged radially spaced from a surface of the steering shaft, wherein the steering shaft is rotatable relative to the reflector, an emitter that emits light, and a receiver that receives light emitted from the emitter. One of the emitter and the receiver is carried by the steering shaft for rotation with the steering shaft, and the other of the emitter and receiver does not rotate with the steering shaft such that rotation of the steering shaft causes relative movement between the emitter and the reflector. The time between an emission of light from the emitter and receipt of light by the receiver is indicative of the steering angle.

In at least some implementations, the reflector is tubular and the steering shaft is located at least partially within the reflector. In at least some implementations, the emitter is carried by the reflector and the receiver is carried by the steering shaft. In at least some implementations, the steering shaft and reflector are coaxial.

In at least some implementations, multiple emitters are provided equally circumferentially spaced apart about an axis of the steering shaft or the reflector. In at least some implementations, multiple receivers are provided equally circumferentially spaced apart about an axis of the steering shaft or the reflector.

In at least some implementations, the reflector includes a radially inner surface and the inner surface is arranged to reflect light emitted from the emitter.

In at least some implementations, the receiver is arranged on a radially outer surface of the steering shaft and the emitter is carried by the reflector and arranged to emit light in a radially inward direction. In at least some implementations, in a home position of the steering shaft that defines a steering angle of zero, the emitter is radially aligned with the receiver.

In at least some implementations, multiple emitters and multiple receivers are arranged in pairs with each pair having one emitter and one receiver and the receiver and emitter of each pair being different than all other pairs, and wherein the receiver of each pair is responsive to the light emitted from the emitter of the same pair and the receiver provides an output when light emitted from the emitter of the same pair is received at the receiver. In at least some implementations, each emitter emits light at a different wavelength than the other emitters.

In at least some implementations, four equally circumferentially spaced emitters are provided, and four equally circumferentially spaced receivers are provided, the emitters and the receivers are arranged in pairs and each pair has one emitter and one receiver and the receiver and emitter of each pair are different than all other pairs. In at least some implementations, the receiver of each pair is responsive to the light emitted from the emitter of the same pair and the receiver provides an output when light emitted from the emitter of the same pair is received at the receiver.

In at least some implementations, the emitter emits laser light or infrared light.

In at least some implementations, the emitted light reflects off the inner surface of the reflector and the outer surface of the steering shaft in at least some positions of the steering shaft.

In at least some implementations, a system for measuring steering angle and a change of steering angle in a vehicle includes a steering shaft, a reflector, multiple emitters and multiple receivers. The steering shaft is rotatable about an axis to change a steering angle of a vehicle. The reflector is arranged radially spaced from a radially outer surface of the steering shaft, and the steering shaft is rotatable relative to the reflector, and the reflector is tubular, coaxial with the steering shaft and has a radially inner surface, and a space is defined between the inner surface of the reflector and the outer surface of the steering shaft. The multiple emitters each emit light into the space, and the multiple receivers each receive light emitted from at least one of the emitters. Either the multiple emitters or the multiple receivers are carried by the steering shaft for rotation with the steering shaft, and the other of the multiple emitters or multiple receivers do not rotate with the steering shaft such that rotation of the steering shaft causes relative movement between the emitters and the reflectors. The time between an emission of light from the emitters and receipt of light by the receivers is indicative of the steering angle.

In at least some implementations, each of the emitters is carried by the reflector and each of the receivers is carried by the steering shaft.

In at least some implementations, the multiple emitters and multiple receivers are arranged in pairs with each pair having one emitter and one receiver and the receiver and emitter of each pair being different than all other pairs, and wherein the receiver of each pair is responsive to the light emitted from the emitter of the same pair and the receiver provides an output when light emitted from the emitter of the same pair is received at the receiver. In at least some implementations, each emitter emits light at a different wavelength than the other emitters.

In at least some implementations, each emitter emits laser light or infrared light, and wherein the emitted light from each emitter reflects off the inner surface of the reflector and the outer surface of the steering shaft in at least some positions of the steering shaft.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
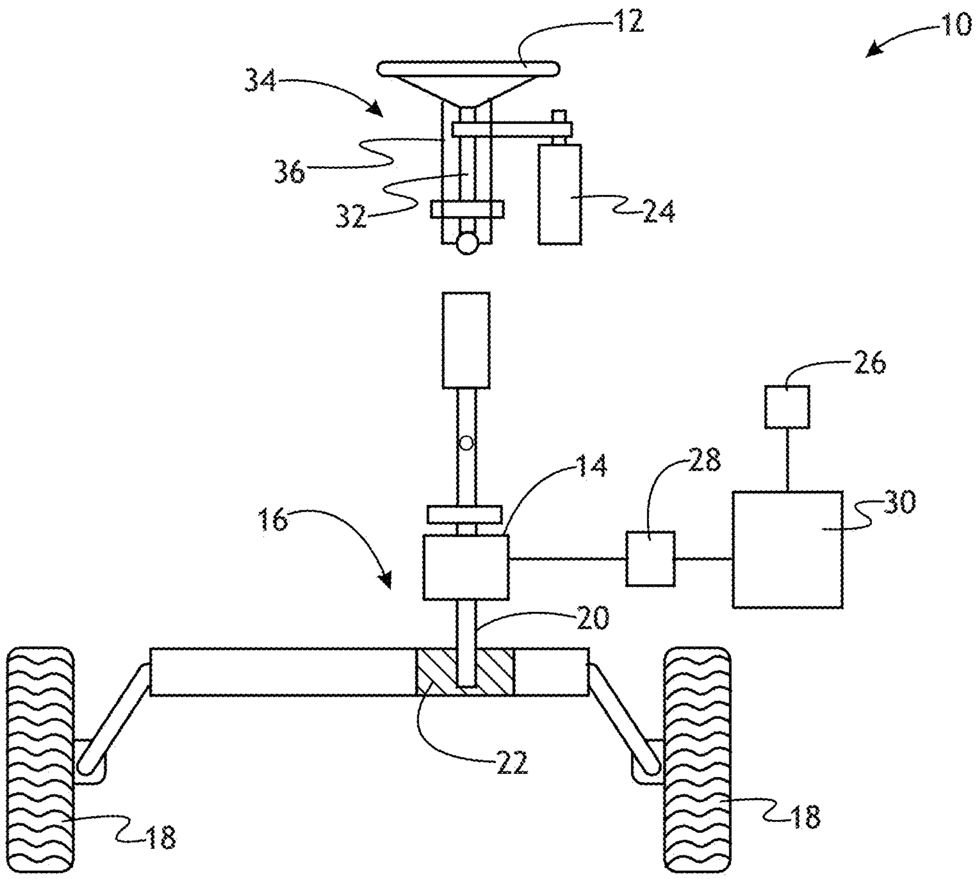
FIG. 1 is a diagrammatic view of a steer-by-wire steering system including a steering angle detection system.

Referring in more detail to the drawings, FIG. 1 illustrates a steer by wire vehicle steering system 10 having a steering input 12, such as a steering wheel, by which a driver can change the steering angle of the vehicle to turn the vehicle, and an electric steering actuator 14 that is coupled to a steering assembly 16 to cause a change in the angle of the steering assembly 16 that is connected to vehicle wheels 18. The steering assembly 16 may include any desired linkage or system for changing the steering angle of the wheels 18, such as but not limited to a rack and pinion system where the steering actuator 14 is coupled to and drives the pinion 20 that in turn drives the rack 22. Thus, when the steering input 12 is rotated, the steering actuator 14 changes the angle of the steering assembly 16 as a function of the magnitude and rate of rotation of the steering input 12. A feedback actuator 24 may be provided to create some resistance to rotation of the steering wheel, to improve the steering "feel" and improve control of the vehicle. The system 10 may further include a vehicle speed sensor 26 and a steering angle sensor 28 that are communicated with a controller 30 programmed to control operation of the steering actuator 14 and feedback actuator 24. The steering angle sensor 28 may detect an actual angle of one or more wheels and act as an actual or output steering angle sensor.

As shown in FIG. 1, the steering input 12 (e.g. steering wheel) and the feedback actuator 24 may be coupled to a steering shaft 32. The magnitude or amount and the rate at which the steering wheel 12 is rotated, is determined by a steering angle detection system 34. The steering angle detection system 34 provides an output to the controller 30 so that the controller can determine an intended steering angle change and control the steering actuator 14 in accordance with the intended steering angle change. The actual steering angle change can be determined by the steering angle sensor 28 which can be used as feedback by the controller 30 to ensure that the intended steering angle change(s) is/are achieved.

Figure 2:
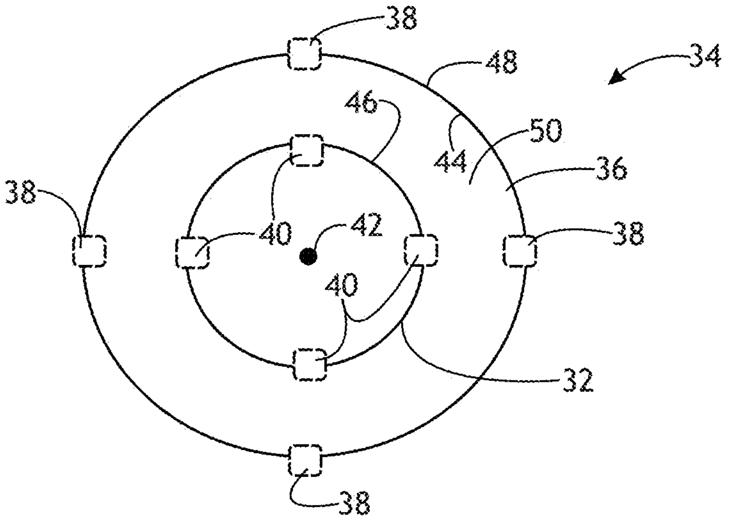
FIG. 2 is a diagrammatic sectional view of a steering shaft and reflector of the steering system and steering angle detection system.
Figure 3:
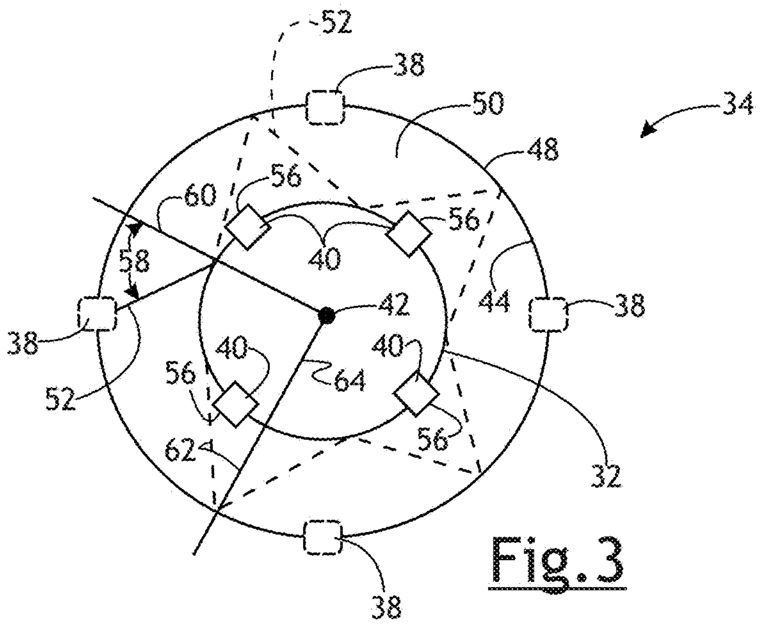
FIG. 3 is a view similar to FIG. 2 showing the steering shaft rotated relative to the reflector.

As shown in FIGS. 2 and 3, the steering angle detection system 34 may include a reflector 36, one or more emitters 38 and one or more receivers 40. In at least some implementations, the reflector 36 surrounds at least part of the steering shaft 32. In the example shown, the reflector 36 is tubular and fully, circumferentially surrounds and is located radially outboard of the steering shaft 32, and extends axially along at part of an axial length of the steering shaft 32, where axially and axial are with regard to a rotational axis 42 of the steering shaft 32. The reflector 36 may be coaxial with the steering shaft 32 with an inner surface 44 that is evenly radially spaced from an outer surface 46 of the steering shaft 32. The reflector 36 is shown in FIG. 2 as a right circular cylinder with a thickness defined between the inner surface 44 and a radially outer surface 48, although other shapes may be used. To reflect light emitted from the one or more emitters 38, the reflector 36 may be made of a suitable material and the inner surface 44 may be constructed to provide desired reflections. In at least some implementations, the reflector 36 is fixed against rotation. Thus, when the steering input 12 and steering shaft 32 are rotated, the steering shaft 32 rotates within and relative to the reflector 36.

In the example shown, multiple emitters 38 are carried by the reflector 36 and have an output directed radially inwardly toward the steering shaft 32, or outward toward the inner surface 44 of the reflector 36. Each emitter 38 is arranged to emit light in the area or space 50 between the inner surface 44 of the reflector 36 and the outer surface 46 of the steering shaft 32. The emitted light may be in the form of a focused beam 52 (e.g. as shown in FIG. 3, for one emitter 38), and the emitters 38 may be a laser or infrared light source. The emitters 38 may be fixed to the reflector 36 and arranged to emit light at a desired angle relative to the reflector 36 and the steering shaft 32. The emitters 38 are circumferentially spaced apart and may be equally spaced from each other and the outputs 54 of the emitters 38 may be at the same distance from the steering shaft 32, in at least some implementations. In the example shown, four emitters 38 are provided, each spaced apart by ninety (90) degrees. A different number of emitters 38, including one and more or less than four may be used. Additional emitters 38 beyond one can enable confirmation of a detected steering angle, and improve system accuracy and reliability, as noted herein.

In the example shown, multiple receivers 40 are carried by the steering shaft 32 and have an input 56 arranged to receive or detect passage of light emitted from at least one emitter 38. The receivers 40 may be fixed to the steering shaft 32 for rotation with the steering shaft 32 so that when the steering shaft 32 rotates, the receivers 40 move relative to the emitters 38. The receivers 40 are circumferentially spaced apart and may be equally spaced from each other and the inputs of the receivers 40 may be at the same distance from the inner surface 44 of the reflector 36 (or outer surface 46 of the steering shaft 32), in at least some implementations. In the example shown, four receivers 40 are provided, each spaced apart by 90 degrees. A different number of receivers 40, including one and more or less than four may be used. Additional receivers 40 beyond one can enable confirmation of a detected steering angle, and improve system accuracy and reliability, as noted herein.

In at least some implementations, the number of receivers 40 is the same as the number of emitters 38, and they are arranged in pairs. In a home or zero angle position of the steering system, as shown in FIG. 2, for a nominal straight forward or straight backward vehicle travel, the receiver 40 and emitter 38 of each pair may be generally radially aligned with each other, in at least some implementations. "Generally radially aligned" means that there is an overlap between the bodies or housings of the receiver 40 and emitter 38. In at least some implementations, generally aligned means that light emitted from the emitter 38 is directly received by or detected by the input 56 of the receiver 40 without the light reflecting off the steering shaft 32. In at least some implementations, the emitter 38 may emit light in a beam 52 that travels in a straight line, and that is at an acute included angle 58 relative to a radius 60 of the steering shaft 32 that intersects the outer surface 46 of the steering shaft 32 at the same point. In this way, a reflection of the beam 52 is also directed at an acute included angle relative to a radius of the steering shaft 32 and is not directly exactly radially outward. In this way, repeated reflections of the emitted light occur off the inner surface 44 of the reflector 36 and the outer surface 46 of the steering shaft 32, and these reflections are not exactly radially outwardly such that the reflected light is directed circumferentially around the steering shaft 32 in the space 50.

In use, when the steering shaft 32 is rotated, the emitters 38 are rotated relative to the receivers 40, as shown in FIG. 3. Light emissions are then reflected between the reflector 36 and steering shaft 32 until the light is incident on or detected at an input of a receiver 40. Receipt of light is sensed or detected by a receiver 40 and the time from emission until reception of the light can be determine by the controller 30, control system including or communicated with the controller, or other processor. In at least some implementations, the emission from each emitter 38 may be different to facilitate determination of the emitter 38 from which received light was emitted. Further, in at least some implementations, a receiver 40 is responsive to light emitted from the respective emitter 38 of the pair including that receiver 40. Thus, although the receiver 40 may receive or detect light from emitters 38 not paired to the receiver 40, the receiver 40 is separately responsive to light emitted from its paired emitter 38. For example, each emitter 38 may emit light at a different wavelength and the receivers 40 may differentiate between received light based upon the wavelength of the received light.

With equally spaced emitters 38 and receivers 40, the time for light from an emitter 38 to be received by a corresponding receiver 40 should be the same for each pair of emitters 38 and receivers 40. In this way, a determined steering angle can be verified one or more times, as desired. Even without equally spaced emitters 38 and receivers 40, the relative time elapsed for an emission and reception of light within a pair should be the same relative to the time for such actions in the home position of the steering system. Other ways of providing redundancy may be used. For example, the time for an emission from a first emitter 38 to reach more than one receiver 40 may be determined for a given steering shaft 32 angle to determine with redundancy the steering shaft 32 angle. This may be done, for example, by comparison to the time for receipt by the receivers 40 when the steering shaft 32 is in the home position or other reference position(s). Similarly, light from multiple emitters 38 may be received by a fewer number of receivers 40 with the time for receipt of the separate emissions determined and used to determine the steering shaft 32 angle. In this way, the number of emitters 38 and receivers 40 need not be the same. Still further, even with the same number of emitters 38 and receivers 40, a receiver 40 may be responsive to light emitted from more than one emitter 38, with the time of light receipt noted for the different emitters 38.

Finally, the emitters 38 may emit light at the same or similar wavelengths and be axially spaced apart sufficiently so that a paired receiver 40 is responsive to light from the paired emitter 38 and not other emitters 38. This recognizes that the receivers 40 may detect light beams 52 that pass within an input area of the receiver 40 and the light beam 52 need not be incident upon a surface of the receiver 40 (i.e. the receiver 40 may detect light that passes through an area around an input of the receiver). So a receiver 40 may be arranged so that it "sees" or detects light from only one emitter 38 (in one example), or the receiver 40 may see or detect light from multiple emitters 38 with the light from each emitter 38 being of a different wavelength so the light from each emitter 38 can be differentiated from the light from other emitters 38. In examples wherein the emitters 38 emit light at different wavelengths, the magnitude of the difference between the wavelengths may be chosen as a function of the resolution or sensitivity of the receivers 40, so that the receivers 40 are capable of distinguishing between the wavelengths.

The reflector 36 may be made of any desired material, and may be highly reflective like polished metal or glass, to reduce light absorption and improve reflection of light from the inner surface 44. In at least some implementations, the reflector 36 may be formed from a transparent material, and the emitters 38 may be arranged to take advantage of a phenomenon known as total internal reflection (TIR). With TIR, light waves are not refracted by a surface but are completely reflected off the surface. In at least some implementations, the system is arranged so that there is no refraction and all light is reflected off the inner surface 44, or so that light refraction is less than 2% (e.g. 98% or more is reflected), and in some implementations is less than 1%. In this way, light is cleanly reflected at a known angle, the wavelength of reflected light does not change, and the receipt of light at a receiver 40 is reliably related to the time from emission and the rotary angle of the steering shaft 32.

IN a TIR system, the emitters 38 are arranged so that light is emitted at an angle equal to or greater than the critical angle, which is the smallest angle of incidence that yields total reflection of the light beam 52. The angle of incidence 62 is measured between a radius 64 extending from the axis 42 to the point of contact of the light beam 52 with the reflecting surface, e.g. the inner surface 44 of the reflector 36, as shown in FIG. 3.

In order to perform the functions and desired processing set forth herein, as well as the computations therefore, the controller/control system 30 may include, but is not limited to, one or more controller(s), control unit(s), processor(s), computer(s), DSP(s), memory, storage, register(s), timing, interrupt(s), communication interface(s), and input/output signal interfaces, and the like, as well as combinations comprising at least one of the foregoing. For example, the control system 30 may include input signal processing and filtering to enable accurate sampling and conversion or acquisitions of such signals from the receivers 40 or other sensors (e.g. steering angle sensor 28). As used herein the term control system or controller 30 may refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. The control system 30 may be distributed among different vehicle modules, such as an infotainment system control module, engine control module or unit, powertrain control module, transmission control module, and the like.

The term "memory" or "storage" as used herein can include computer readable memory, and may be volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system and/or instructions executable by a processor or controller or the like to enable control or allocate resources of a computing device.

The steering angle detection system 34 enables fast and accurate determination of a rotary angle of a steering shaft 32 and a rate of change of the steering angle, which, in turn, can be used to control the steering system 16. Light may periodically be emitted from one or more emitters 38 to periodically determine the steering angle. In at least some implementations, the light is pulsed at a frequency of between 50,000 and 1,000,000 pulses per second or more, which enables suitably fast and frequent steering angle determinations to sufficiently quickly and accurately detect a rate of change of the steering angle. The rate of change can be used to control one or both of the steering system angle and the feedback motor output, as desired. Further, detection of a steering shaft 32 that approaches or passes a full rotation can be accomplished by comparing previous steering angle determinations to determine direction and relative angle and avoid the system erroneously calculating a 360-degree steering shaft angle with a zero degree steering shaft angle (or a 370-degree angle with a 10-degree angle) as the time different between emission and receipt of emitted light will be the same for those discrete readings.

Figure 4:
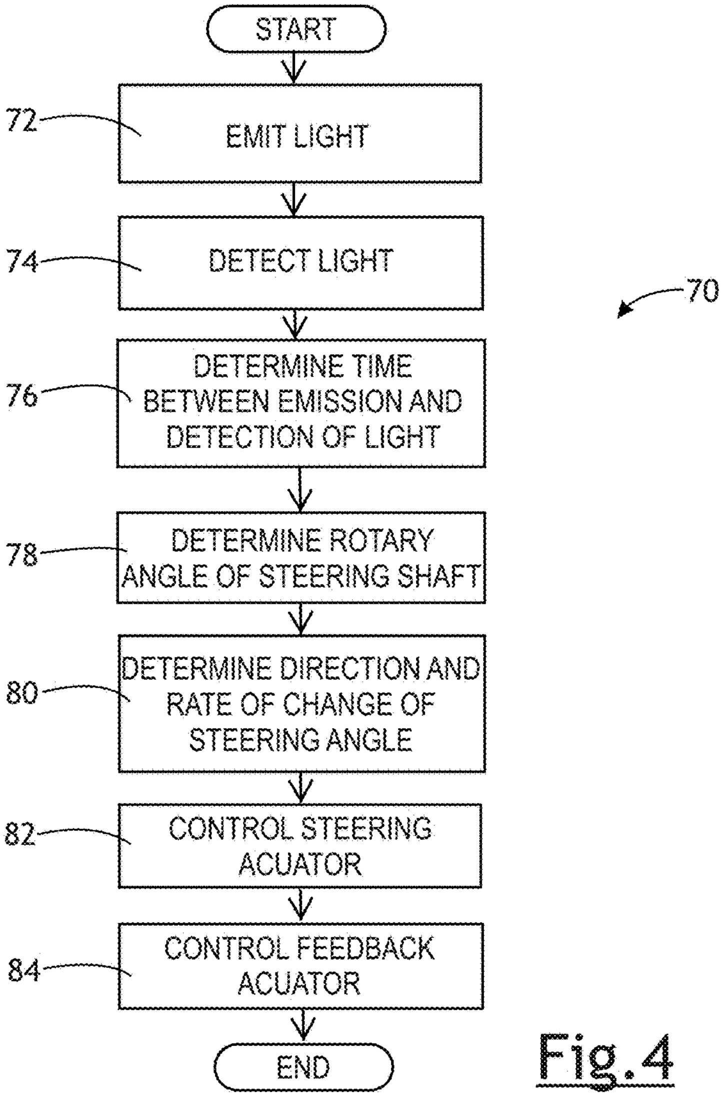
FIG. 4 is a flowchart of a method of determining a steering angle.

FIG. 4 illustrates a method 70 of determining a vehicle steering angle and a rate of change of steering angle via multiple determinations of steering angle. The method 70 may begin at step 72 in which light is emitted from one or more emitters and the emitted light is detected by the one or more receivers in step 74. In step 76, a time between the light emission(s) and the light detection(s) is determined, and in step 78, a rotary angle of the steering shaft is determined. In step 80, prior steering shaft angle determinations may be used to determine one or both of a rotation direction and rate of change of the steering shaft rotary angle. Then, in step 82, the steering actuator 14 may be controlled to cause a corresponding change in the steering angle of the wheels 18 of the vehicle, and in step 84 the feedback actuator 24 may also be controlled to provide a corresponding feel or steering effort to the driver. The actual steering angle of the wheels can be determined by the sensor 28 and the actuator 14 controlled as a function of this feedback as well, to ensure the desired steering angle is actually achieved and to adjust the actuator 14 output if not achieved.

In this way, the accurate and fast steering angle determinations enabled by the non-contact steering angle detection system 34 can enable accurate control of the steering angle of the vehicle. The emitted light travels very quickly within the space and changes in steering angle can be detected very quickly and accurately, enabled improved steering response and control. Further, magnets and magnetic fields are not needed for the steering angle sensing and these things that can interfere with other electrical/electronic components, thereby reducing electrical noise in the vehicle systems.

What is claimed is:

1. A system for measuring steering angle and a change of steering angle in a vehicle, comprising:

a steering shaft that is rotatable to change a steering angle of a vehicle;

a reflector arranged radially spaced from a surface of the steering shaft, wherein the steering shaft is rotatable relative to the reflector;

an emitter that emits light; and a receiver that receives light emitted from the emitter, wherein one of the emitter and the receiver is carried by the steering shaft for rotation with the steering shaft, and the other of the emitter and receiver does not rotate with the steering shaft such that rotation of the steering shaft causes relative movement between the emitter and the reflector, and wherein the time between an emission of light from the emitter and receipt of light by the receiver is indicative of the steering angle.

2. The system of claim 1 wherein the reflector is tubular and the steering shaft is located at least partially within the reflector.

3. The system of claim 2 wherein the emitter is carried by the reflector and the receiver is carried by the steering shaft.

4. The system of claim 2 wherein the steering shaft and reflector are coaxial.

5. The system of claim 2 wherein the reflector includes a radially inner surface and the inner surface is arranged to reflect light emitted from the emitter.

6. The system of claim 2 wherein the receiver is arranged on a radially outer surface of the steering shaft and the emitter is carried by the reflector and arranged to emit light in a radially inward direction.

7. The system of claim 6 wherein, in a home position of the steering shaft that defines a steering angle of zero, the emitter is radially aligned with the receiver.

8. The system of claim 7 wherein four equally circumferentially spaced emitters are provided, and four equally circumferentially spaced receivers are provided, the emitters and the receivers are arranged in pairs and each pair has one emitter and one receiver and the receiver and emitter of each pair are different than all other pairs.

9. The system of claim 8 wherein the receiver of each pair is responsive to the light emitted from the emitter of the same pair and the receiver provides an output when light emitted from the emitter of the same pair is received at the receiver.

10. The system of claim 1 wherein multiple emitters are provided equally circumferentially spaced apart about an axis of the steering shaft or the reflector.

11. The system of claim 10 wherein multiple receivers are provided equally circumferentially spaced apart about an axis of the steering shaft or the reflector.

12. The system of claim 11 wherein the multiple emitters and multiple receivers are arranged in pairs with each pair having one emitter and one receiver and the receiver and emitter of each pair being different than all other pairs, and wherein the receiver of each pair is responsive to the light emitted from the emitter of the same pair and the receiver provides an output when light emitted from the emitter of the same pair is received at the receiver.

13. The system of claim 12 wherein each emitter emits light at a different wavelength than the other emitters.

14. The system of claim 1 wherein the emitter emits laser light or infrared light.

15. The system of claim 2 wherein the emitted light reflects off the inner surface of the reflector and the outer surface of the steering shaft in at least some positions of the steering shaft.

16. A system for measuring steering angle and a change of steering angle in a vehicle, comprising:

a steering shaft that is rotatable about an axis to change a steering angle of a vehicle;

a reflector arranged radially spaced from a radially outer surface of the steering shaft, wherein the steering shaft is rotatable relative to the reflector, and the reflector is tubular, coaxial with the steering shaft and has a radially inner surface, and a space is defined between the inner surface of the reflector and the outer surface of the steering shaft;

multiple emitters that each emit light into the space; and multiple receivers that each receive light emitted from at least one of the emitters, wherein either the multiple emitters or the multiple receivers are carried by the steering shaft for rotation with the steering shaft, and the other of the multiple emitters or multiple receivers do not rotate with the steering shaft such that rotation of the steering shaft causes relative movement between the emitters and the reflectors, and wherein the time between an emission of light from the emitters and receipt of light by the receivers is indicative of the steering angle.

17. The system of claim 16 wherein each of the emitters is carried by the reflector and each of the receivers is carried by the steering shaft.

18. The system of claim 16 wherein the multiple emitters and multiple receivers are arranged in pairs with each pair having one emitter and one receiver and the receiver and emitter of each pair being different than all other pairs, and wherein the receiver of each pair is responsive to the light emitted from the emitter of the same pair and the receiver provides an output when light emitted from the emitter of the same pair is received at the receiver.

19. The system of claim 18 wherein each emitter emits light at a different wavelength than the other emitters.

20. The system of claim 16 wherein each emitter emits laser light or infrared light, and wherein the emitted light from each emitter reflects off the inner surface of the reflector and the outer surface of the steering shaft in at least some positions of the steering shaft.

* * * * *